Patented June 22, 1926.

1,589,700

UNITED STATES PATENT OFFICE.

CARL IMMERHEISER, OF LUDWIGSHAFEN-ON-THE-RHINE, CARL NEUBAUER, OF MANNHEIM, AND ERWIN SCHARF, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE OF COLORED CELLULOSE PLASTICS AND SOLUTIONS THEREOF.

No Drawing. Application filed November 29, 1924, Serial No. 752,938, and in Germany June 26, 1924.

The invention relates to an improved method of producing colored celluloid, or similar cellulose plastics. Hitherto the coloring of such masses has been effected with the aid of dyestuff solutions, for example alcoholic solutions of basic dyestuffs or dyestuff bases. Insoluble pigments have also been mixed with nitrocellulose in the form of a paste or dough while mechanically treating until the pigment was thoroughly incorporated.

We have now discovered that very valuable colorings of cellulose ester plastics can be produced by means of such organic coloring matters, as are insoluble or sparingly soluble in the solvents which may be used in coloring the plastics or for making solutions thereof. Coal-tar dyestuffs, color lakes and pigment coloring matters are suitable whether insoluble or soluble in water. When employing water-soluble dyestuffs, water must not of course, be used. Media having a dissolving property for the dyestuffs may also be used, though only in a small amount or in conjunction with non-solvent liquids so that the coloring matter is only dissolved to a small extent, if at all.

In accordance with our present invention, the colored cellulose esters, or plastics, are most suitably prepared in such a way that the dyestuff particles are in a state of extremely fine division, representing or approaching a colloidal state of dispersion, which result is for example obtained by mechanically treating, or milling, for example by rolling, the dyestuff with the cellulose ester and proper additional compounds, for example camphor, or any other softener, or swelling agent, until a solution of a test portion in a liquid which is a solvent for the cellulose ester but not for the dyestuff does not allow the dyestuff to settle to any substantial amount even in a dilute condition and in a rather long period of time. When this stage is reached, the mass contains the coloring matter in a colloidally or nearly colloidally dispersed condition and, in a thin layer, it is transparent. By transparent we mean transparent or nearly transparent, but not opaque.

The invention makes the fastest dyestuffs available for the manufacture of colored celluloid or cellulose ester plastics which latter in consequence thereof have excellent fastness to light.

We have further discovered that with the said mechanical treatment, mineral and earth pigments can also be used to produce colored cellulose plastics which, when dissolved, give solutions from which the pigment does not settle to any substantial amount when allowed to stand for quite a considerable time. Mineral or earth pigment coloring matters can also be used in conjunction with organic coloring matters insoluble or sparingly soluble in the solvents used and dissolved, or soluble, organic coloring matters may also be added in all cases.

The cellulose ester plastics so colored can be used as such or dissolved in suitable solvents. The solutions thus obtained do not allow the coloring matter to settle even in a diluted state and after standing for quite a considerable time, and they are eminently suitable for producing colored coatings on wood, glass, leather, metals, paper, fabrics and the like, when an addition of oil or other bodies proper to make the coatings more pliable may be made. Such coatings may be produced, for example, by spraying the solutions onto the surfaces of the articles.

In order to illustrate more fully the nature of this invention the following examples are given, but the invention is not restricted to these examples. The parts are by weight.

Example 1.

1000 parts of gelatinized celluloid mass are mixed with one part of green PLX; the mixture is strongly kneaded together preferably by means of heated rollers. After a short time, a pellucid green mass is obtained, possessing very good fastness to light.

Example 2.

1000 parts of gelatinized cellon (cellulose acetate plastic) are mechanically treated together with one part of lithol fast orange R powder, at an elevated temperature, until a clear orange red mass is obtained.

Example 3.

1000 parts of gelatinized cellulose nitrate or acetate plastic are worked together with one part of indanthrene blue 2GSL powder, as described in the foregoing example, until a pellucid blue mass is produced.

Other azo or vat coloring matters, or coal-tar coloring matters of other classes may be used, or color lakes, also for example milori blue (Prussian blue).

Example 4.

100 parts of gelatinized celluloid are rolled in thin layers with 15 parts of lithol fast orange R powder, until the coloring matter is practically colloidally dispersed in the plastic. 8 parts of the product are then dissolved in 100 parts of amyl or butyl acetate, and a solution is obtained which can be used with advantage for producing coatings or lacquerings on leather, for example by spraying them onto the leather. The coatings so produced have valuable properties and in spite of their transparent character they have a good covering power owing to certain optical properties, perhaps the Tyndall-phenomenon.

Instead of the coloring matter named, many others may be used, for example lithol fast scarlet RN or the water-soluble dyestuff lithol bordeaux B, or the calcium lake of lithol rubine BN.

Example 5.

100 parts of gelatinized nitro-cellulose plastic and 15 parts of lithol fast yellow GN powder are milled with the aid of a celluloid roller until a practically homogeneous mass is obtained, and a dilute solution of a test portion in acetone does not allow the pigment to settle to any substantial degree even after standing for quite a long time. This being the case, a mass transparent or pellucid, at least in a thin layer, is produced. The celluloid thus obtained can be employed for various purposes; it may also be dissolved in liquids which are no solvents for the coloring matter, for example a mixture of 50 per cent, by weight, of acetone, 25 per cent of methyl-cyclohexanone and 25 per cent of amyl-cyclohexanone; the solutions obtained thereby contain the coloring matter in a colloidal or nearly colloidal state and are eminently suitable as leather covering lacquers.

Example 6.

100 parts of celluloid plastic and 15 parts of magenta AB (powder) are repeatedly treated, in thin layers, with rollers until a practically homogeneous mass is produced.

It may be dissolved in 1000 parts of butyl acetate which dissolves the dyestuff very sparingly. Other basic dyestuffs, for example methyl violet, may be used in a similar way.

Example 7.

15 parts of sienna, preferably in a finely divided form, are mixed with 78 parts of gelatinized nitrocellulose plastic and rolled until a dilute solution of a test portion in cyclohexanone and acetone no longer deposits the pigment to any substantial amount, after standing.

Other mineral or earth coloring matters may be employed in a similar manner, for example under or titanium white, or lamp black. Titanium white (15 parts) may also be used in conjunction with indanthrene blue 2GSL (5 parts) or with the soluble typophor carmine FB (15 parts).

Now what we claim is:

1. The process of manufacturing colored cellulose plastics which comprises incorporating in a cellulose-ester plastic a coloring matter, so that the coloring matter is in a colloidal condition, and does not tend to settle out from a solution of the said plastic, even after considerable dilution said coloring matter being practically insoluble in a solvent to be applied to the plastic mass when coloring it or making it into a solution.

2. The process of manufacturing colored cellulose ester products which comprises mechanically working a cellulose ester plastic together with a coloring matter practically insoluble in a solvent to be applied to the plastic mass when coloring it or for making it into a solution until a solution of a test portion in a liquid which is not a solvent for the coloring matter, does not allow the coloring matter to settle to any substantial amount, and until a thin layer of the product is more or less transparent.

3. The process of manufacturing colored cellulose ester products which comprises milling a cellulose ester plastic and a coloring matter practically insoluble in a solvent employed when coloring or for dissolving the plastic mass, until a practically colloidal dispersion of the coloring matter is produced and until a thin layer of the product is more or less transparent.

4. The process of manufacturing colored cellulose ester products which comprises milling a cellulose ester plastic and a coloring matter practically insoluble in a solvent employed when coloring or for dissolving the plastic mass, until a solution of a test portion in a liquid which is not a solvent for the coloring matter does not allow the coloring matter to settle to any substantial amount and until a thin layer of the product is more or less transparent, and dissolving the mass in a liquid which is not a solvent for the coloring matter.

5. As a composition of matter, a solution for producing more or less transparent coatings on suitable supports comprising a cellulose ester, a solvent therefor and a coloring matter substantially insoluble in the solvent and in a highly dispersed, substantially nonsettling condition.

6. As a composition of matter a solution for producing more or less transparent coatings on suitable supports comprising a cellulose ester, a solvent therefor and a coloring matter substantially insoluble in the solvent and in a highly dispersed, substantially nonsettling condition and a coloring matter soluble in the solvent.

7. As a composition of matter, a solution for producing substantially transparent coatings on suitable supports comprising a cellulose ester, a solvent therefor and a coloring matter substantially insoluble in the solvent and in a highly dispersed, substantially nonsettling condition and a coloring matter soluble in the solvent and a softener.

8. A coating consisting of a cellulose ester product comprising a cellulose ester plastic in which has been incorporated a coloring matter insoluble in the said plastic or a solvent to be applied thereto, said coloring matter being in a colloidal or practically colloidal state of dispersion so that it does not tend appreciably to settle from solutions of the product and so that the product in thin layers is substantially transparent.

9. A coating for solid supports comprising a cellulose ester solution containing a coloring matter substantially insoluble in the solvent, but in a highly dispersed nonsettling condition, and a coloring matter soluble in the solvent which coating in thin layers is substantially transparent.

10. As an article of manufacture a cellulose ester product substantially transparent in a thin layer plastic containing a coloring matter in a highly dispersed condition so as to give a non-settling solution of about the character of a colloidal solution when dissolved in a solvent which is not a solvent for the coloring matter.

In testimony whereof we have hereunto set our hands.

CARL IMMERHEISER.
CARL NEUBAUER.
ERWIN SCHARF.